(12) United States Patent
Chiang

(10) Patent No.: US 9,028,596 B2
(45) Date of Patent: May 12, 2015

(54) GREEN CASCADE-TYPE DEVICE FOR INTERCEPTING AND FILTERING OIL FUMES

(71) Applicant: Fancy Food Service Equipment Co., Ltd., Kaohsiung (TW)

(72) Inventor: Ting-Fang Chiang, Kaohsiung (TW)

(73) Assignee: Fancy Food Service Equipment Co., Ltd., Kaohsiung (TW)

( * ) Notice: Subject to any disclaimer, the term of this patent is extended or adjusted under 35 U.S.C. 154(b) by 0 days.

(21) Appl. No.: 14/013,451

(22) Filed: Aug. 29, 2013

(65) Prior Publication Data

US 2015/0059582 A1    Mar. 5, 2015

(51) Int. Cl.
*F24C 15/20* (2006.01)
*B01D 47/02* (2006.01)

(52) U.S. Cl.
CPC ........... *F24C 15/2057* (2013.01); *B01D 47/027* (2013.01); *B01D 47/028* (2013.01)

(58) Field of Classification Search
None
See application file for complete search history.

(56) References Cited

U.S. PATENT DOCUMENTS

| | | | |
|---|---|---|---|
| 3,381,679 A * | 5/1968 | Gonzalez | 126/299 E |
| 3,802,158 A * | 4/1974 | Ohle | 96/53 |
| 3,805,685 A * | 4/1974 | Carns | 126/299 E |
| 4,617,909 A * | 10/1986 | Molitor | 126/299 R |
| 4,753,218 A * | 6/1988 | Potter | 126/299 E |
| 5,042,457 A * | 8/1991 | Gallagher | 126/299 E |
| 5,069,197 A * | 12/1991 | Wisting | 126/299 E |
| 5,141,538 A * | 8/1992 | Derington et al. | 96/329 |
| 6,125,841 A * | 10/2000 | Boudreault | 126/299 D |
| 6,223,741 B1 * | 5/2001 | Panos | 126/299 E |
| 7,614,396 B2 * | 11/2009 | So | 126/299 E |
| 2003/0164093 A1 * | 9/2003 | Brownell et al. | 95/268 |
| 2005/0061309 A1 * | 3/2005 | Gallagher | 126/299 E |
| 2009/0235819 A1 * | 9/2009 | Brookman | 95/185 |
| 2011/0271834 A1 * | 11/2011 | Lehman et al. | 95/213 |

* cited by examiner

*Primary Examiner* — Duane Smith
*Assistant Examiner* — Pankti Patel
(74) *Attorney, Agent, or Firm* — Rosenberg, Klein & Lee

(57) ABSTRACT

A cascade-type device for intercepting and filtering oil fumes comprises an exhausting space formed between a housing and a filter and a cascading space formed between the filter and an external plate. A wind entrance communicated with the cascading space is formed between a lower portion of the external plate and the housing. The housing accommodates rinsing liquid whose height is higher than a bottom edge of the external plate. A negative pressure formed in the exhausting and the cascading space while drawing air allows the rinsing liquid blown by a wind pressure to hit the filter and generate water bloom for combining oil molecules of oil fumes. When the oil fumes further pass the filter, the oil molecules are adhered to the filter again and then scoured off by the water bloom, thereby attaining a dual-filtering effect and an automatic cleanliness of the filter and the housing.

18 Claims, 6 Drawing Sheets

GREEN CASCADE-TYPE DEVICE FOR INTERCEPTING AND FILTERING OIL FUMES

BACKGROUND OF THE INVENTION

1. Field of the Invention

The present invention relates to an oil filtering device, particular to a green cascade-type device for intercepting and filtering oil fumes.

2. Description of the Related Art

Referring to FIG. 1, a conventional extractor apparatus 1 includes a wind hood 11, a housing 12 connected to the wind hood 11, an exhaust fan unit 13 disposed on the housing 12, and a filter 14 disposed between the housing 12 and the exhaust fan unit 13. When the exhaust fan unit 13 is operated, oil fumes as arrowed are sucked into the housing 12, and the filter 14 is applied to filter oil molecules of the oil fumes. The filtered oil fumes are thence drained out of the exhaust fan unit 13. However, the prior art 1 has some problems. For example, the oil fumes are incessantly adhered to the filter 14, with the result that the filter 14 needs to be detached from the housing 12 for cleaning at regular intervals. It is not convenient to use. Further, in the interior of the housing 12 is the oil sludge accumulated continuously, which is hardly cleaned and removed as the housing 12 is not defined as an open space. The oil sludge ignites at a high cooking temperature and causes fire disasters easily, which still requires improvements.

SUMMARY OF THE INVENTION

The object of the present invention is to provide a green cascade-type device for intercepting and filtering oil fumes which cooperates the filter with the housing that creates water bloom during the entry of the oil fumes into the housing to obtain a double removal of oil molecules, thereby promoting a filtering and intercepting quality of oil fumes. The present invention also cleans the housing and the filter automatically in order to save water, prevent fires, enhance the oil intercepting rate, and attain the using convenience.

The green cascade-type device for intercepting and filtering oil fumes in accordance with the present invention comprises a housing, a filter disposed in the housing, a water inlet pipe as well as a drain pipe extending into an interior of the housing, respectively. Wherein, the housing includes at least one external plate and an internal plate disposed opposite to the external plate. The filter is disposed on the internal plate. A rinsing liquid is disposed at a lower part of the housing. A height of the rinsing liquid is higher than a bottom edge of the external plate. An exhausting space is defined between the housing and the filter, and a cascading space is defined between the filter and the external plate, whereby the cascading space is closed and enclosed by the housing, the internal plate, the filter, the external plate, and the rinsing liquid. A wind entrance is defined between a lower portion of the external plate and the housing. The wind entrance is communicated with the cascading space. Accordingly, when the air in the exhausting space is drawn, the exhausting space and the cascading space are formed into a negative state to allow oil fumes to be sucked into the cascading space for passing the rinsing liquid, which causes the rinsing liquid to flush and collide with the filter and create water bloom. Therefore, the temperature of the oil fumes is decreased by the water bloom in the cascading space, and partial oil molecules of the oil fumes are adhered to the water bloom to obtain a first filtering effect. When the oil fumes further pass the filter, a more violent collision between the oil fumes and the filter allows the oil molecules to be adhered to the filter again so that the oil molecules fall off to the rinsing liquid by the scouring of the water bloom to obtain a second filter effect. The scouring of the rinsing liquid also washes the filter and the interior of the housing automatically to maintain the cleanliness of the device, save water, prevent fires, and increase the oil filtering rate and using convenience.

Preferably, a guiding covering can be disposed outward from the housing.

Preferably, the device is installed in a cooking platform which includes a sucking conduit connected to the wind entrance and a drawing conduit connected to the exhausting space.

Preferably, a discharging conduit is disposed at a bottom of the housing.

Preferably, the water inlet pipe is connected to an automatic water inlet device which includes a water tank, a floating unit disposed in the water tank, and a water inlet valve whose on-off operation is driven by the floating unit.

Preferably, a transparent window is disposed on the external plate.

Preferably, a handle is disposed on the external plate, whereby the external plate can be easily detached from the housing by using the handle.

Preferably, an exhaust fan apparatus is connected to the exhausting space for drawing air in the exhausting space.

The advantages of the present invention over the known prior arts will become more apparent to those of ordinary skilled in the art upon reading the following descriptions in junction with the accompanying drawings.

DETAILED DESCRIPTION OF THE PREFERRED EMBODIMENTS

Figure 1:
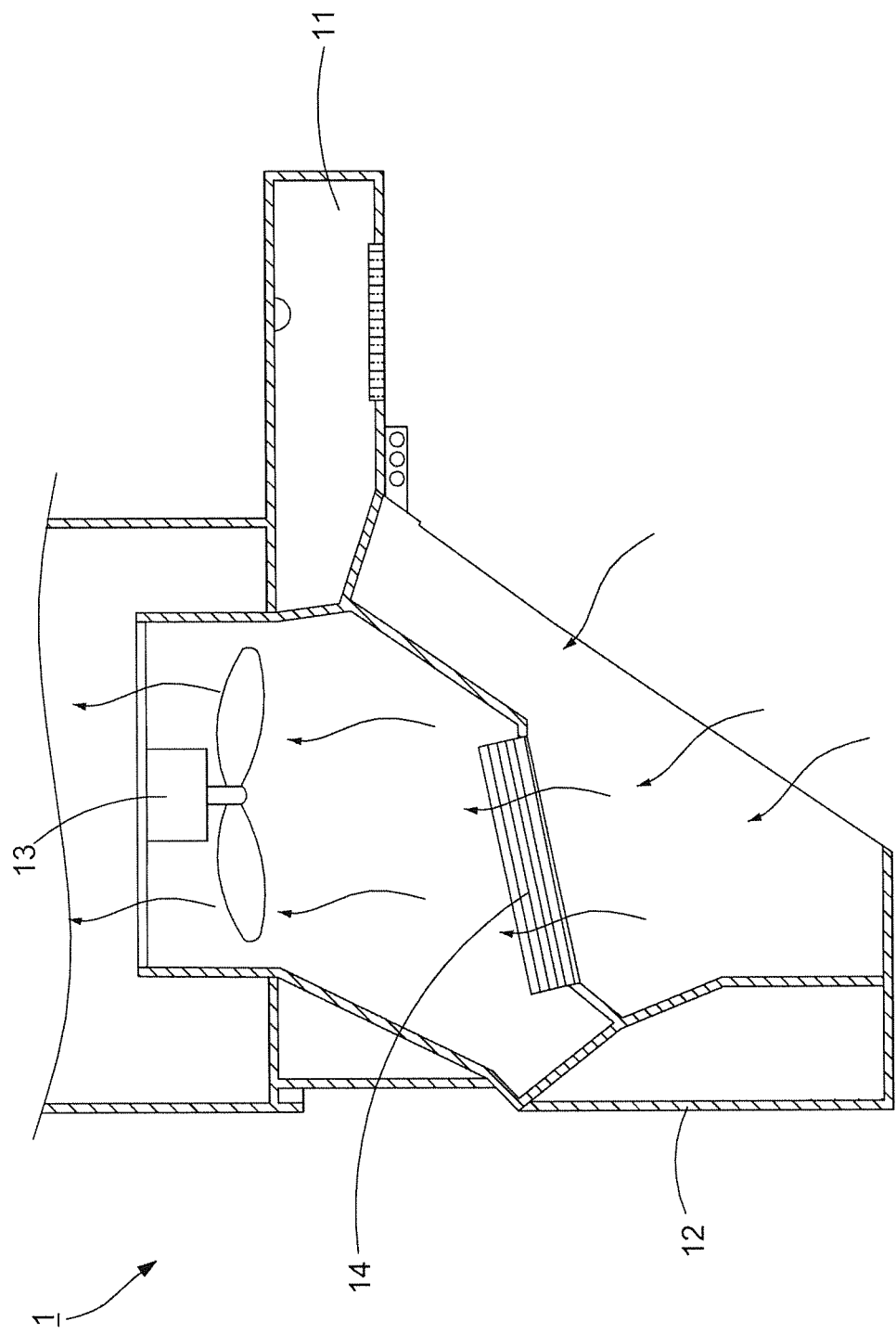
FIG. 1 is a schematic view showing a conventional configuration.
Figure 2:
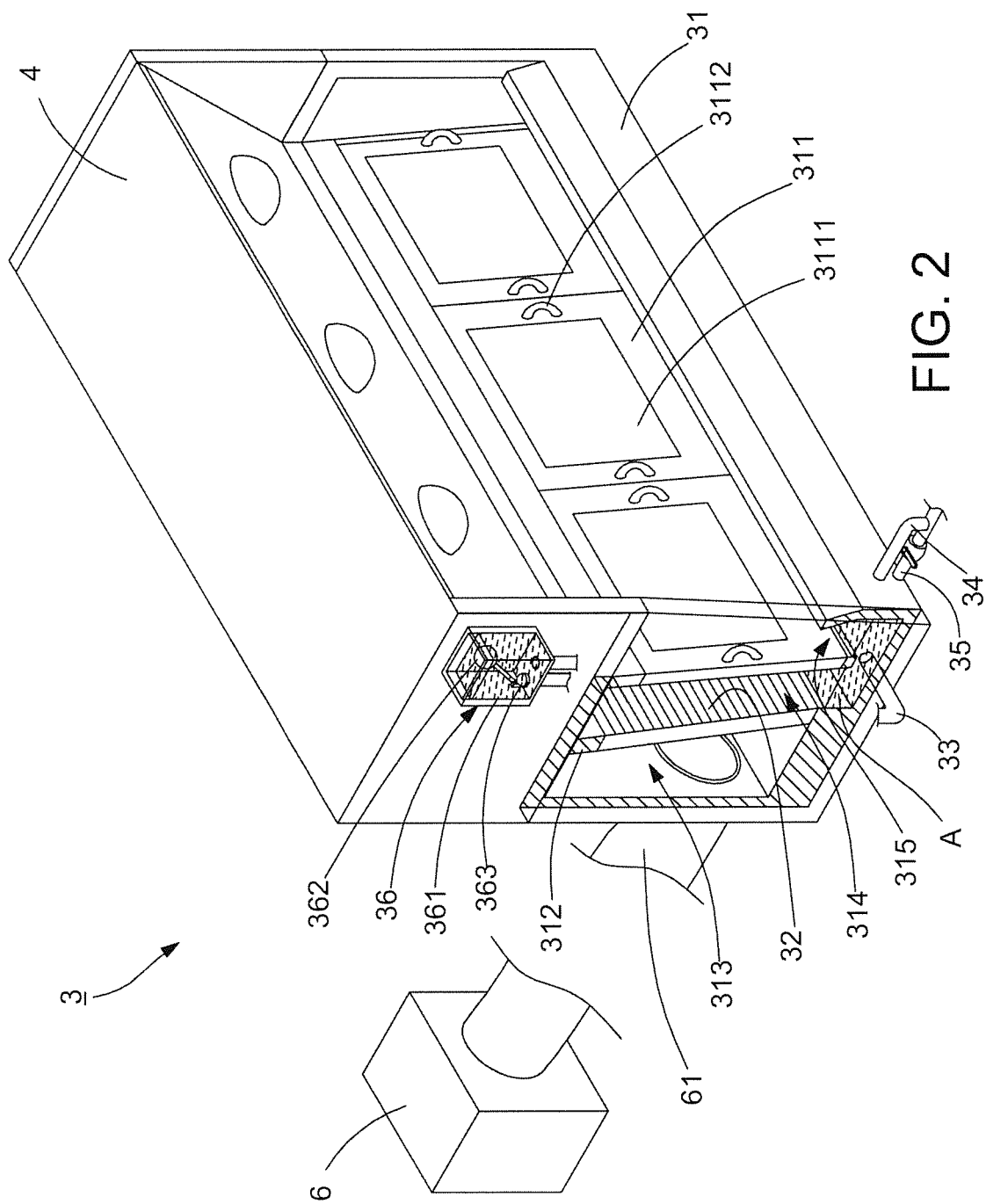
FIG. 2 is a perspective view showing a first preferred embodiment of the present invention.
Figure 3:
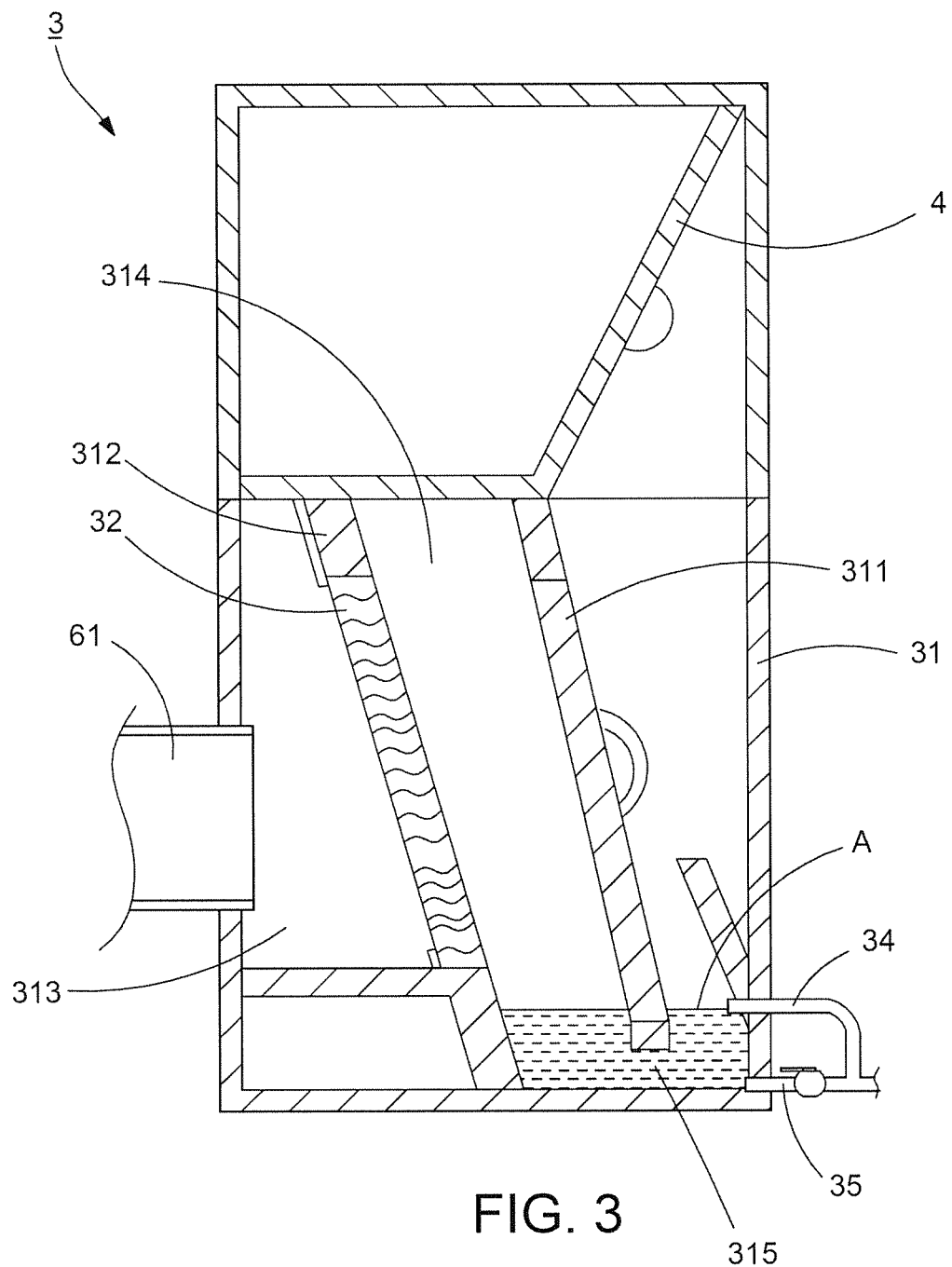
FIG. 3 is a cross-sectional view showing the structure of the first preferred embodiment.

FIG. 2 and FIG. 3 show a first preferred embodiment of a green cascade-type device for intercepting and filtering oil fumes 3 of the present invention. The device 3 comprises a housing 31, a filter 32 disposed in the housing 31, a water inlet pipe 33 extending into an interior of the housing 31, and a drain pipe 34 extending into the interior of the housing 31. Wherein, the housing 31 includes at least one external plate 311 and an internal plate 312 disposed opposite to the external plate 311. The filter 32 is disposed on the internal plate 312. An exhausting space 313 is defined between the housing 31 and the filter 32, a cascading space 314 is defined between the filter 32 and the external plate 311, and a wind entrance 315 is defined between a lower portion of the external plate 311 and the housing 31. The wind entrance 315 is communicated with the cascading space 314. In this preferred embodiment, a guiding covering 4 can be preferably disposed outward from the housing 31, whereby the device 3 can function as an extractor apparatus directly. Further, a rinsing liquid A, e.g. water, is accommodated at a lower part of the housing 31, and a height of the rinsing liquid A is higher than a bottom edge of the external plate 311, whereby the cascading space 314 is closed and enclosed by the housing 31, the internal plate 312, the filter 32, the external plate 311, and the rinsing liquid A. A transparent window 3111 can be disposed on the external plate 311, which allows the user to view the practical operation in the cascading space 314 clearly. A handle 3112 can also be disposed on the external plate 311, whereby the external plate 311 can be directly and easily detached from the housing 31 by using the handle 3112.

The drain pipe 34 is located at the lower part of the housing 31 and inserted into the interior of the housing 31. A height of the place where the drain pipe 34 is arranged is higher than the bottom edge of the external plate 311, which not only allows the height of the rinsing liquid A to be higher than the bottom edge of the external plate 311 but allows the portion of the rinsing liquid A whose height is higher than the drain pipe 34 to be automatically flowed into the drain pipe 34 for discharging. Further, a discharging conduit 35 is preferably disposed at a bottom of the housing 31, so that the user can completely drain the rinsing liquid A out of the housing 31 via the discharging conduit 35 if necessary. Preferably, the water inlet pipe 33 can be connected to an automatic water inlet device 36. In this preferred embodiment, the automatic water inlet device 36 is disposed on the guiding covering 4. The device 36 includes a water tank 361 connected to the water inlet pipe 33, a floating unit 362 disposed in the water tank 361, and a water inlet valve 363 whose on-off operation is driven by the floating unit 362. Therefore, the rinsing liquid A within the housing 31 can be automatically supplemented by the water tank 361 to level the height of the rinsing liquid A with the drain pipe 34. An exhaust fan apparatus 6 is preferably disposed on the housing 31 and connected to the exhausting space 313 of the housing 31. Alternatively, it is adopted that a pipe 61 is arranged between the exhaust fan apparatus 6 and the housing 31 for drawing air in the exhausting space 313.

Figure 4:
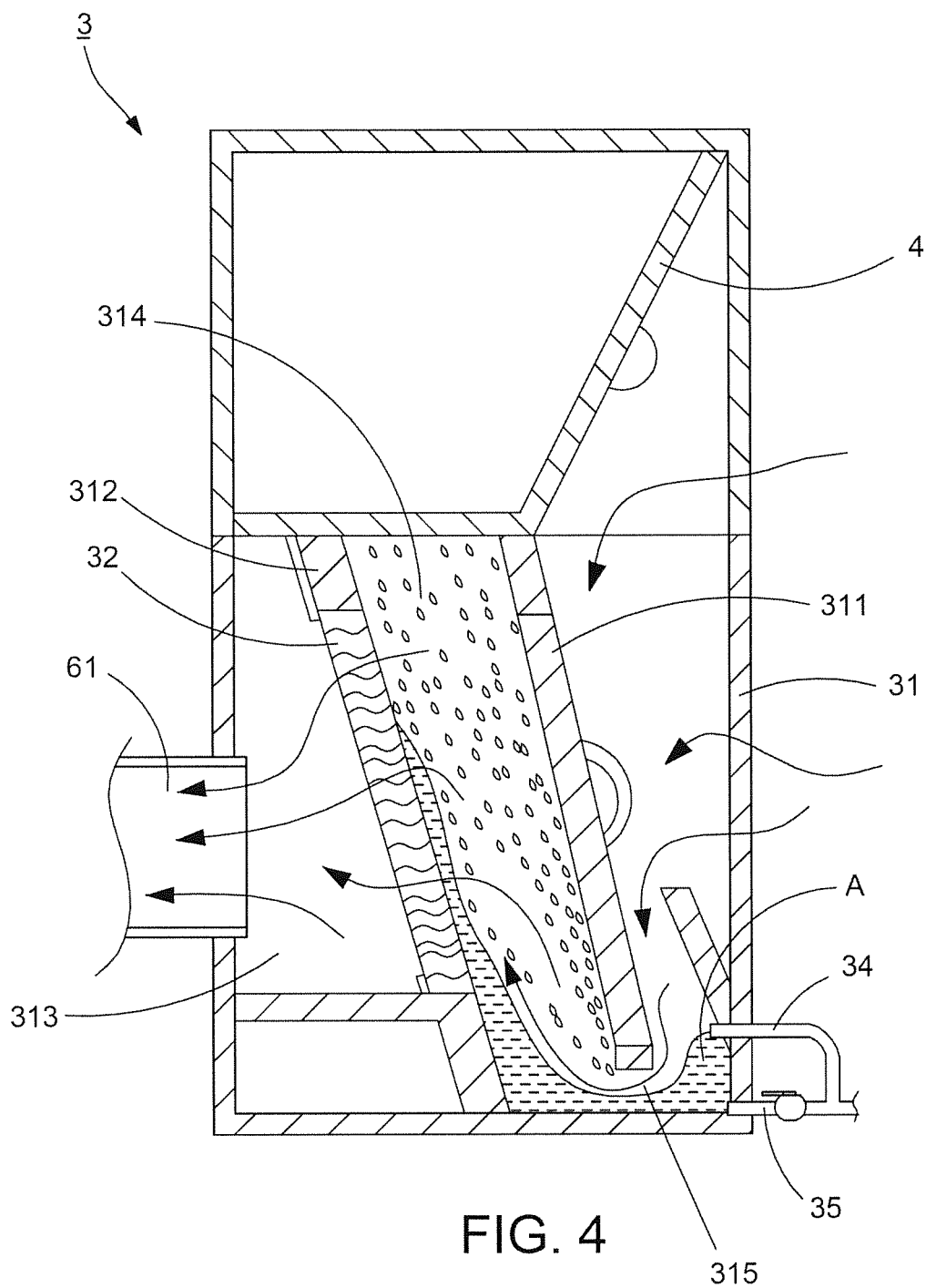
FIG. 4 is a schematic view showing the operation of the first preferred embodiment in cross section.

Referring to FIG. 2 and FIG. 4, in operation, the exhaust fan apparatus 6 is operated to create a flowing wind pressure which causes the exhausting space 313 and the cascading space 314 to be in a negative pressure state. When the oil fumes (as arrowed) sucked from the wind entrance 315 pass the rinsing liquid A, the rinsing liquid A is blown by the wind pressure to collide with the filter 32 and create water bloom during the collision. The temperature of the oil fumes is decreased by the water bloom, and the partial oil molecules of the oil fumes are combined with the rinsing liquid A. Further, the oil fumes are filtered and intercepted by the filter 32 again, namely the oil fumes are adhered to the filter 32 to form oil sludge when they intend to pass the filter 32. Therefore, the intercepting and filtering effect of the oil fumes is doubled. Concurrently, the rinsing liquid A blown by the wind pressure keeps scouring the filter 32 and rinses the oil sludge adhered to the filter 32, with the result that the oil sludge falls off to mix with the rinsing liquid A for maintaining the cleanliness of the filter 32 and the interior of the housing 31. Different from the prior art with mass oil sludge adhered to the filter and the housing, the device 3 can omit a periodical cleaning process to increase a use convenience. When the oil sludge and the oil molecules are congregated to form oil, the oil floats on the top portion of the rinsing liquid A due to the specific gravity differential between oil and water. Further, the separation of the oil from the water in view of the nature of water level differential allows the oil at the top water level of the rinsing liquid A to be drained out of the drain pipe 34, whereby the rinsing liquid A is not largely discharged to facilitate a repeated and efficient use of the rinsing liquid A and attain a water-saving effect.

Figure 6:
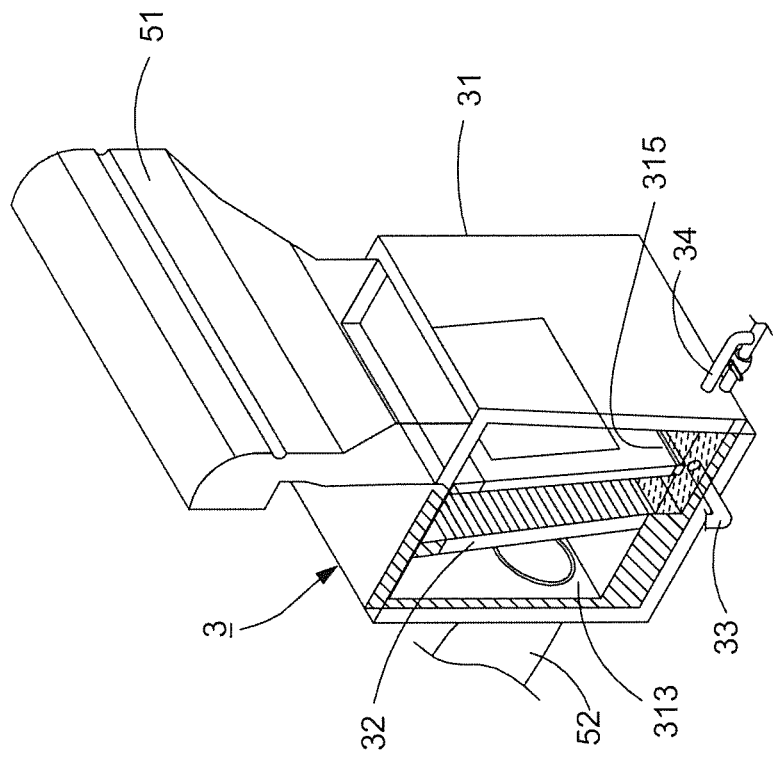
FIG. 6 is a partial perspective view showing the element of the second preferred embodiment of the present invention.
Figure 5:
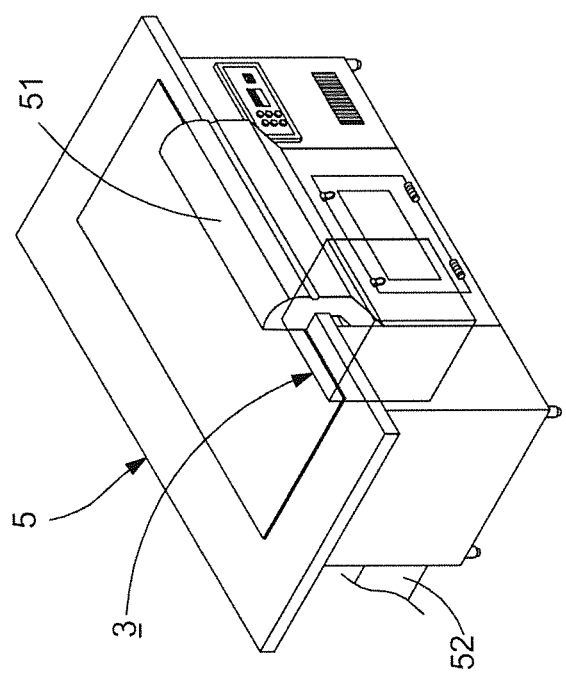
FIG. 5 is a perspective view showing a second preferred embodiment of the present invention.
Figure 7:
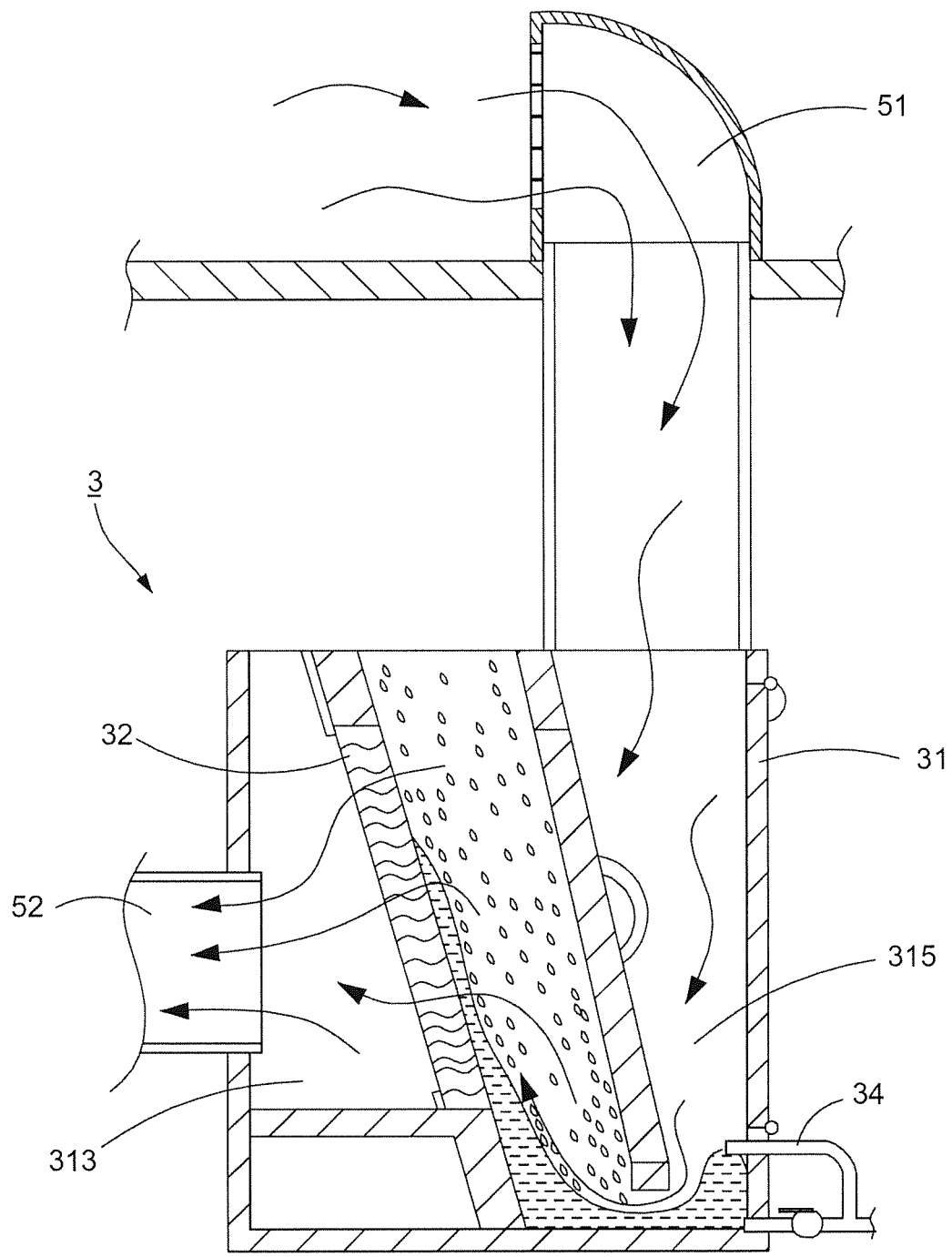
FIG. 7 is a schematic view showing the operation of the second preferred embodiment in cross section.

Referring to FIG. 5, FIG. 6, and FIG. 7 show a second preferred embodiment of the present invention. The device 3 at least comprises a housing 31, a filter 32, a water inlet pipe 33, and a drain pipe 34. The concatenation of correlated elements and purposes is the same as the first embodiment and herein is omitted. This preferred embodiment is characterized in that the device 3 is further installed inside a cooking platform 5. The cooking platform 5 includes a sucking conduit 51 connected to the wind entrance 315 and a drawing conduit 52 connected to the exhausting space 313, whereby the oil fumes (as arrowed in FIG. 7) derived from the cooking of the cooking platform 5 is sucked into the sucking conduit 51, filtered by the device 3, and thence discharged from the drawing conduit 52. Therefore, the present invention benefits a broad application of the device 3.

To sum up, the present invention takes advantage of concatenation between the housing, the filter, the water inlet pipe, and the drain pipe to form a negative pressure in the cascading space at the stage of drawing air in the exhausting space, whereby oil fumes sucked by the wind entrance are subject to the rinsing liquid to decrease the oil molecules thereof. When the oil fumes enter the cascading space, the rinsing liquid is raised and blown in the cascading space to form water bloom for combing with oil molecules, thereby obtaining a double removal of oil molecules of the oil fumes. The water bloom also cleans the filter and the interior of the housing automatically to maintain the cleanliness of the device and attain effects of saving water, avoiding fires, promoting an oil intercepting and filtering rate, and increasing the using convenience.

While we have shown and described the embodiment in accordance with the present invention, it should be clear to those skilled in the art that various modifications maybe made in further embodiments described without departing from the spirit and scope of the invention.

What is claimed is:

1. A cascade filtering device for intercepting and filtering oil fumes, comprising;
   a housing, a filter disposed in said housing,
   a water inlet pipe extending into an interior of said housing, and
   a drain pipe extending into said interior of said housing; wherein, said housing includes at least one external plate and an internal plate on which said filter is disposed; said external plate being disposed opposite to said internal plate, an exhausting space being defined between said housing and said filter,
   a cascading space being defined between said filter and said external plate, and
   a wind entrance being defined between a lower part of said external plate and said housing for being communicated with said cascading space; a rinsing liquid being accommodated at a lower part of said housing, and
   a height of said rinsing liquid being higher than a bottom edge of said external plate, whereby said cascading space is closed and enclosed by said housing, said filter, said internal plate, said external plate, and said rinsing liquid, which allows oil fumes of an outside of said housing subject to a wind pressure to be sucked into said cascading space via said wind entrance in order to cause said rinsing liquid to collide with said filter; said drain pipe being disposed at said lower part of said housing and inserted into said interior thereof, a height of a place where said drain pipe is arranged being higher than said bottom edge of said external plate.

2. The device as claimed in claim 1, wherein a guiding covering is disposed outward from said housing.

3. The device as claimed in claim 1 being further installed within a cooking platform, wherein said cooking platform includes a sucking conduit connected to said wind entrance and a drawing conduit connected to said exhausting space.

4. The device as claimed in claim 1, wherein a discharging conduit is disposed at a bottom of said housing.

5. The device as claimed in claim 2, wherein a discharging conduit is disposed at a bottom of said housing.

6. The device as claimed in claim 3, wherein a discharging conduit is disposed at a bottom of said housing.

7. The device as claimed in claim 1, wherein said water inlet pipe is connected to an automatic water inlet device which includes a water tank, a floating unit disposed in said water tank, and a water inlet valve whose on-off operation is driven by said floating unit.

8. The device as claimed in claim 2, wherein said water inlet pipe is connected to an automatic water inlet device which includes a water tank, a floating unit disposed in said water tank, and a water inlet valve whose on-off operation is driven by said floating unit.

9. The device as claimed in claim 3, wherein said water inlet pipe is connected to an automatic water inlet device which includes a water tank, a floating unit disposed in said water tank, and a water inlet valve whose on-off operation is driven by said floating unit.

10. The device as claimed in claim 1, wherein a transparent window is disposed on said external plate.

11. The device as claimed in claim 2, wherein a transparent window is disposed on said external plate.

12. The device as claimed in claim 3, wherein a transparent window is disposed on said external plate.

13. The device as claimed in claim 1, wherein a handle is disposed on said external plate, whereby said external plate is detached from said housing by using said handle.

14. The device as claimed in claim 2, wherein a handle is disposed on said external plate, whereby said external plate is detached from said housing by using said handle.

15. The device as claimed in claim 3, wherein a handle is disposed on said external plate, whereby said external plate is detached from said housing by using said handle.

16. The device as claimed in claim 1, wherein an exhaust fan apparatus is connected to said exhausting space for drawing air in said exhausting space.

17. The device as claimed in claim 2, wherein an exhaust fan apparatus is connected to said exhausting space for drawing air in said exhausting space.

18. The device as claimed in claim 3, wherein an exhaust fan apparatus is connected to said exhausting space for drawing air in said exhausting space.

* * * * *